US008857100B2

(12) United States Patent  (10) Patent No.: US 8,857,100 B2
Huddleston  (45) Date of Patent: Oct. 14, 2014

(54) WEEDLESS FISHING LURE DEVICE AND RELATED METHOD

(75) Inventor: Samuel M. Huddleston, Mesquite, NV (US)

(73) Assignee: Huddleston Deluxe, Inc., Mesquite, NV (US)

(*) Notice: Subject to any disclaimer, the term of this patent is extended or adjusted under 35 U.S.C. 154(b) by 435 days.

(21) Appl. No.: 12/493,934

(22) Filed: Jun. 29, 2009

(65) Prior Publication Data

US 2010/0115822 A1  May 13, 2010

Related U.S. Application Data

(60) Provisional application No. 61/114,455, filed on Nov. 13, 2008.

(51) Int. Cl.
*A01K 85/02* (2006.01)
*A01K 85/00* (2006.01)

(52) U.S. Cl.
USPC ....... 43/42.24; 43/42.39; 43/42.15; 43/42.37; 43/42.1; 43/42.41

(58) Field of Classification Search
USPC ............ 43/42.24, 42.39, 42.15, 42.36, 42.37, 43/42.4, 42.41, 42.1
See application file for complete search history.

(56) References Cited

U.S. PATENT DOCUMENTS

| | | | | |
|---|---|---|---|---|
| 534,506 A | * | 2/1895 | Hastings | 43/42.1 |
| 877,793 A | * | 1/1908 | Murphy | 43/44.2 |
| 1,152,698 A | * | 9/1915 | Bonner | 43/44.8 |
| 1,846,538 A | * | 2/1932 | Albers et al. | 43/42.1 |
| 1,890,266 A | * | 12/1932 | Schadkll et al. | 43/42.41 |
| 1,992,969 A | * | 3/1935 | Soukup | 43/44.8 |

(Continued)

FOREIGN PATENT DOCUMENTS

| | | | | |
|---|---|---|---|---|
| EP | 1384402 A1 | * | 1/2004 | A01K 85/00 |
| EP | 1523886 A1 | * | 4/2005 | A01K 85/02 |

(Continued)

*Primary Examiner* — Darren W Ark
(74) *Attorney, Agent, or Firm* — Richard T. Ogawa; Ogawa P.C.

(57) ABSTRACT

A weedless fishing lure device. The device has a single piece soft bodied lure material having a first end and a second end. An air ballast formed by at least one cavity region provided within one or more portions of the single piece soft bodied lure material and extending from a vicinity of the first end of the single piece soft bodied lure material toward the second end of the single piece soft bodied lure material. The device has a lower portion of the soft bodied lure member bordering a lower portion of the cavity region and an upper portion of the single piece soft bodied lure member bordering an upper portion of the cavity region. An outer region is formed from the single piece soft bodied lure material. An opening is within the upper portion of the single piece soft bodied lure member. The device also has hook member having an eyelet and a shank, which extends from the eyelet to at least one bend section configured in an annular manner and having at least one portion extending back toward a direction of the eyelet and terminating at a point. The hook member is substantially enclosed within the outer region of the single piece soft bodied lure member. The shank is embedded within the lower portion of the single piece soft bodied lure member, and the point is substantially snag proof or weedless.

18 Claims, 8 Drawing Sheets

(56) References Cited

U.S. PATENT DOCUMENTS

| | | | | |
|---|---|---|---|---|
| 2,008,437 A * | 7/1935 | De Witt | | 43/42.36 |
| 2,025,270 A * | 12/1935 | Chaney | | 43/42.15 |
| 2,106,755 A * | 2/1938 | McArthur | | 43/42.37 |
| 2,129,245 A * | 9/1938 | Stenstrom | | 43/42.39 |
| 2,149,054 A * | 2/1939 | Jones | | 43/42.36 |
| 2,235,600 A * | 3/1941 | Ammerman | | 43/42.36 |
| 2,590,461 A * | 3/1952 | Rasch | | 43/42.1 |
| 2,820,314 A * | 1/1958 | Scott | | 43/42.39 |
| 2,847,791 A * | 8/1958 | Simmons | | 43/42.39 |
| 2,994,982 A * | 8/1961 | Murawski | | 43/42.39 |
| 3,025,628 A * | 3/1962 | Murawski | | 43/42.1 |
| 3,133,371 A * | 5/1964 | Christensen | | 43/42.37 |
| 3,230,656 A * | 1/1966 | Kozjak | | 43/42.1 |
| 3,293,790 A * | 12/1966 | Konomos | | 43/44.2 |
| 3,465,466 A * | 9/1969 | Showalter | | 43/44.8 |
| 3,611,614 A * | 10/1971 | Ward | | 43/42.39 |
| 3,861,073 A * | 1/1975 | Thomassin | | 43/42.39 |
| 3,868,784 A * | 3/1975 | Sabol | | 43/42.39 |
| 3,978,606 A * | 9/1976 | Riggs | | 43/42.24 |
| 4,094,087 A * | 6/1978 | Carpenter | | 43/42.24 |
| 4,123,870 A * | 11/1978 | Wiskirchen | | 43/42.39 |
| 4,244,133 A * | 1/1981 | Martinek | | 43/42.39 |
| 4,783,928 A * | 11/1988 | Weaver | | 43/42.24 |
| 4,976,060 A * | 12/1990 | Nienhuis | | 43/42.41 |
| 5,025,586 A * | 6/1991 | Pixton | | 43/42.39 |
| 5,129,175 A * | 7/1992 | Pixton | | 43/42.39 |
| 5,152,094 A * | 10/1992 | Strickland | | 43/42.39 |
| 5,193,299 A * | 3/1993 | Correll et al. | | 43/42.24 |
| 5,218,780 A * | 6/1993 | Jacobson | | 43/44.8 |
| 5,678,350 A * | 10/1997 | Moore | | 43/42.15 |
| 5,784,827 A * | 7/1998 | Jimenez et al. | | 43/44.8 |
| 5,815,978 A * | 10/1998 | Huddleston | | 43/42.39 |
| 5,915,944 A * | 6/1999 | Strunk | | 43/42.1 |
| 5,946,848 A * | 9/1999 | Ysteboe et al. | | 43/42.24 |
| 6,041,540 A * | 3/2000 | Potts | | 43/42.24 |
| 6,122,857 A * | 9/2000 | Rhoten | | 43/42.39 |
| 6,141,900 A * | 11/2000 | Rudolph | | 43/42.24 |
| 6,212,818 B1 * | 4/2001 | Huddleston | | 43/42.15 |
| 6,266,916 B1 * | 7/2001 | Dugan | | 43/42.41 |
| 6,393,757 B2 * | 5/2002 | Bomann | | 43/42.24 |
| 6,857,220 B2 * | 2/2005 | King | | 43/42.24 |
| 6,912,808 B1 * | 7/2005 | Mak | | 43/42.39 |
| 7,185,457 B2 * | 3/2007 | Nichols | | 43/42.39 |
| 7,356,963 B2 * | 4/2008 | Scott | | 43/42.15 |
| 7,627,979 B2 * | 12/2009 | Huddleston | | 43/42.39 |
| 7,735,257 B1 * | 6/2010 | Firmin | | 43/44.8 |
| 7,743,550 B2 * | 6/2010 | Huddleston | | 43/42.39 |
| 7,793,457 B2 * | 9/2010 | Hogan | | 43/42.1 |
| 7,827,731 B2 * | 11/2010 | Gibson | | 43/42.39 |
| 7,841,127 B1 * | 11/2010 | Nakamichi | | 43/44.8 |
| 8,020,338 B2 * | 9/2011 | Brown | | 43/42.36 |
| 2002/0078619 A1 * | 6/2002 | Hurtle, Jr. | | 43/42.39 |
| 2003/0024150 A1 * | 2/2003 | Hawkins | | 43/42.39 |
| 2005/0204607 A1 * | 9/2005 | Nichols | | 43/42.37 |
| 2007/0175083 A1 * | 8/2007 | Wilson et al. | | 43/42.15 |
| 2007/0199232 A1 * | 8/2007 | Littlejohn | | 43/42.41 |
| 2008/0078114 A1 * | 4/2008 | Pack | | 43/42.15 |
| 2009/0307960 A1 * | 12/2009 | Oelerich et al. | | 43/42.1 |
| 2010/0126058 A1 * | 5/2010 | Hughes | | 43/42.39 |
| 2011/0010983 A1 * | 1/2011 | Briccetti et al. | | 43/42.1 |
| 2012/0023804 A1 * | 2/2012 | Hogan | | 43/42.39 |

FOREIGN PATENT DOCUMENTS

| | | | | |
|---|---|---|---|---|
| JP | 04197121 A * | 7/1992 | | A01K 85/00 |
| JP | 09191795 A * | 7/1997 | | A01K 85/02 |
| JP | 10248442 A * | 9/1998 | | A01K 85/02 |
| JP | 2001069875 A * | 3/2001 | | A01K 85/00 |
| JP | 2001204304 A * | 7/2001 | | A01K 85/02 |
| JP | 2002084927 A * | 3/2002 | | A01K 85/02 |
| JP | 2002153166 A * | 5/2002 | | A01K 85/00 |
| JP | 2002218883 A * | 8/2002 | | A01K 85/00 |
| JP | 2003079278 A * | 3/2003 | | A01K 85/02 |
| JP | 2004008034 A * | 1/2004 | | A01K 85/00 |
| JP | 2005237355 A * | 9/2005 | | A01K 85/02 |
| JP | 2006109824 A * | 4/2006 | | A01K 85/02 |
| JP | 2006223296 A * | 8/2006 | | A01K 85/00 |
| JP | 2009072109 A * | 4/2009 | | A01K 85/02 |
| JP | 2009089707 A * | 4/2009 | | A01K 85/02 |
| JP | 2010057404 A * | 3/2010 | | A01K 85/02 |

\* cited by examiner

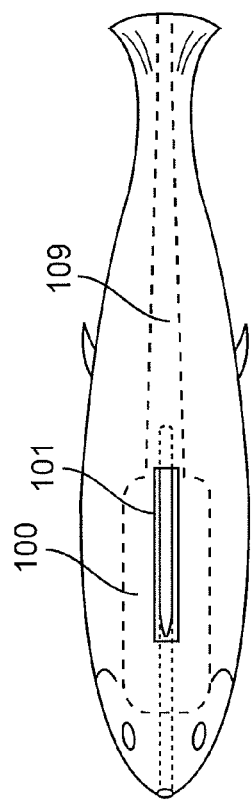
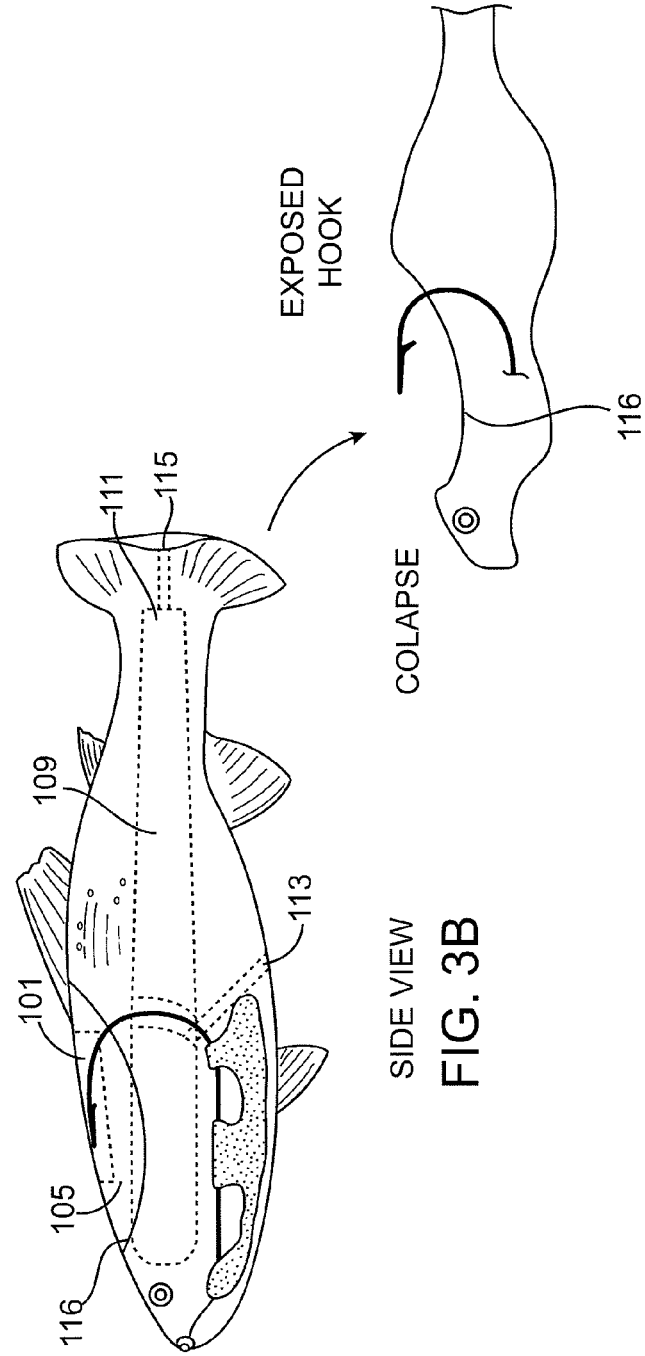
TOP VIEW
FIG. 3A
SIDE VIEW
FIG. 3B

WEEDLESS FISHING LURE DEVICE AND RELATED METHOD

CROSS-REFERENCES TO RELATED APPLICATIONS

This application claims priority to U.S. Provisional Patent Application No. 61/114,455, filed Nov. 13, 2008, entitled "WEEDLESS FISHING LURE DEVICE AND RELATED METHOD," by inventor SAMUEL M. HUDDLESTON, commonly assigned and incorporated by reference herein for all purposes.

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The present invention relates to the field of fishing lures. More particularly, the present invention provides a weedless swim bait fishing lure having improved performance with respect to depth and speed of the lure at which swim bait can be fished. Merely by way of example, the invention has been applied to a swim bait, but it would be recognized that other applications can exist. For example, the invention can be applied to a crawfish, a frog, a pan fish, a baby bass, a trout, a shad, a snake, a turtle, a duck, other freshwater baits, and salt water baits, including but not limited to sardines, mackerel, squid, octopus, and others.

One of the greatest sporting activities known is fishing. Fishing often involves using a bait, whether natural or artificial, which is attached to one or more hooks that are tied to a line attached to a fishing rod and reel. The bait is introduced into a body of water such as a lake, stream, or ocean to attract and lure a fish to strike it. Once the fish strikes, sharp hooks coupled to the bait pierce into the tissue of the fish. Oftentimes, the fish becomes hooked in the mouth. After a struggle between the fisherman and the fish, one of them wins. Either the fisherman happily lands the fish or the fish breaks itself from the hook and swims away.

Artificial bait is often called a fishing lure or lure. The lure is generally a soft or hard object designed to resemble and move like an item of fish prey. See, for example, http://en.wikipedia.org. Often times, the lure is equipped with one or more hooks that hold the fish attracted to the lure. Common types of lures include spoons, spinners, plugs, plastic worms, and spinner baits. The lures range from those called Daredevls™ from Eppinger Manufacturing to Senko™ worms from Gary Yamanoto to a variety of spinner baits from Persuader American Angler and other companies.

Another example of a fishing lure for large mouth bass is known as a swim bait. The early pioneers of swim baits include Samuel M. Huddleston and Chomp Josephite, who developed one of the most famous swim baits for their lure company Castaic Lure Company founded in the early 1990's. Huddleston also developed and invented the "big bait" theory. That is, big bass like to eat big baits. Most recently, Huddleston developed one of the leading modern swim baits, known as the "Huddleston Deluxe." Many other companies followed Huddleston and developed other swimbait lure devices. Although highly successful, the swim baits have limitations.

As an example, most swim baits are equipped with large treble hooks and/or large protruding single hook designs, which are exposed. Such exposed hooks often snag to debris and other structures, which can become expensive and degrade the swim baits action. Additionally, most swim baits are often fairly expensive so fisherman use caution in throwing the bait into heavy cover, such as fallen trees, brush, and weed structures, which may hold very large black bass and other species. Often times, it is difficult to get the swim bait close enough to the heavy cover to entice the large bass to strike. These and other limitations are described throughout the present specification and more particularly below.

From the above, it is seen that improved techniques for lure designs are highly desired.

BRIEF SUMMARY OF THE INVENTION

According to the present invention, techniques related to the field of fishing lures are provided. More particularly, the present invention provides a weedless swim bait fishing lure having improved performance with respect to depth and speed of the lure at which swim bait can be fished. Merely by way of example, the invention has been applied to a swim bait, but it would be recognized that other applications can exist. For example, the invention can be applied to a crawfish, a frog, a pan fish, a baby bass, a trout, a shad, a snake, a turtle, a duck, other freshwater baits, and salt water baits, including but not limited to sardines, mackerel, squid, octopus, and others.

In a specific embodiment, the present invention provides a weedless fishing lure device. The device has a head section and a soft bodied lure material having a first end and a second end. In a preferred embodiment, the first end extends from the head section to the second end, which can be a soft and flexible tail section. In a specific embodiment, the device has an air ballast formed by at least one cavity region provided within one or more portions of the soft bodied lure material and extending from a vicinity of the first end of the soft bodied lure material toward the second end of the soft bodied lure material. In a specific embodiment, the cavity is bounded by a lower portion of the soft bodied lure member bordering a lower portion of the cavity region and an upper portion of the soft bodied lure member bordering an upper portion of the cavity region. In a preferred embodiment, the lure device has an outer region formed from the soft bodied lure material to resemble skin and/or scales of a baitfish or other type of fishing bait. In a specific embodiment, the lure device has an opening within the upper portion of the soft bodied lure member. In a specific embodiment, the opening has an inner border region within the outer region of the soft bodied material.

In a specific embodiment, the lure device has a hook member having an eyelet and a shank. The shank extends from the eyelet to at least one bend section. In a specific embodiment, the bend section is configured in an annular manner and has at least one portion extending back toward a direction of the eyelet and terminates at a point. In a specific embodiment, the hook member is substantially enclosed within the outer region of the soft bodied lure member such that the eyelet is at least partially exposed within an outer region of the head section. Additionally, the shank is embedded within the lower portion of the soft bodied lure member, while the opening exposes at least the one portion extending back toward the direction of the eyelet and the point, which is substantially within a vicinity of the border region for weedless or snag-proof use of the fishing lure device. In a specific embodiment, the device has a weight member coupled to one or more portions of the shank and embedded within the lower portion of the soft bodied lure member.

In a specific embodiment, the invention provides a weedless fishing lure device. The device has a single piece soft bodied lure material having a first end and a second end. An air ballast formed by at least one cavity region provided within one or more portions of the single piece soft bodied lure material and extending from a vicinity of the first end of the single piece soft bodied lure material toward the second end of the single piece soft bodied lure material. The device has a lower portion of the soft bodied lure member bordering a lower portion of the cavity region and an upper portion of the single piece soft bodied lure member bordering an upper portion of the cavity region. An outer region is formed from the single piece soft bodied lure material. An opening is within the upper portion of the single piece soft bodied lure member. The device also has hook member having an eyelet and a shank, which extends from the eyelet to at least one bend section configured in an annular manner and having at least one portion extending back toward a direction of the eyelet and terminating at a point. The hook member is substantially enclosed within the outer region of the single piece soft bodied lure member. The shank is embedded within the lower portion of the single piece soft bodied lure member, and the point is substantially snag proof or weedless.

Still further, the present invention provides a weedless fishing lure device. The device includes a soft bodied lure member having a first end and a second end. The device also has at least one cavity region provided within one or more portions of the soft bodied lure member. The device has a lower portion of the soft bodied lure member and an upper portion of the soft bodied lure member. The device has an opening within the upper portion of the soft bodied lure member. In a specific embodiment, the opening has a border region, which is coupled to an outer region of the soft bodied material. In a specific embodiment, the device has a hook member having a shank, which extends from a first end to at least one bend section, which is configured in an annular manner. The bend section also has at least one portion extending back toward a direction of the first end and terminating at a second end, which is a point. In a preferred embodiment, the hook member is substantially enclosed within an interior region of the soft bodied lure member such that the shank is positioned within the lower portion of the soft bodied lure member. The opening is configured to expose at least an upper portion of the second end. The point is substantially within a vicinity of the border region for snag proof or weedless operation. In a preferred embodiment, the cavity region is configured to fully or partially collapse to expose at least the point to hook a striking fish upon impact from the striking fish.

Many benefits are achieved by way of the present invention over conventional techniques. For example, the present technique provides an easy to use weedless bait design, which is durable and cost effective. Additionally, the present lure device can be made using conventional polymeric plastics such as plastisol or other vinyl or other plastic based materials, as well as biological biodegradable materials, and others, which can be molded as a single unit. In a specific embodiment, the lure is substantially weedless and can be dragged through heavy cover including weeds, rocks, brush, branches, moss, and other types of structure, and their combinations. In a specific embodiment, the hook is substantially hidden and would not scare off hook sensitive or shy fish. Depending upon the embodiment, one or more of these benefits may be achieved. These and other benefits will be described in more detail throughout the present specification and more particularly below.

Various additional objects, features and advantages of the present invention can be more fully appreciated with reference to the detailed description and accompanying drawings that follow.

BRIEF DESCRIPTION OF THE DRAWINGS

FIGS. 3A and 3B are simplified top view and side view diagrams of a weedless lure device according to an alternative embodiment of the present invention.

DETAILED DESCRIPTION OF THE INVENTION

According to the present invention, techniques related to the field of fishing lures are provided. More particularly, the present invention provides a weedless swim bait fishing lure having improved performance with respect to depth and speed of the lure at which swim bait can be fished. Merely by way of example, the invention has been applied to a swim bait, but it would be recognized that other applications can exist. For example, the invention can be applied to a crawfish, a frog, a pan fish, a baby bass, a trout, a shad, a snake, a turtle, a duck, other freshwater baits, and salt water baits, including but not limited to sardines, mackerel, squid, octopus, and others.

Figure 1:
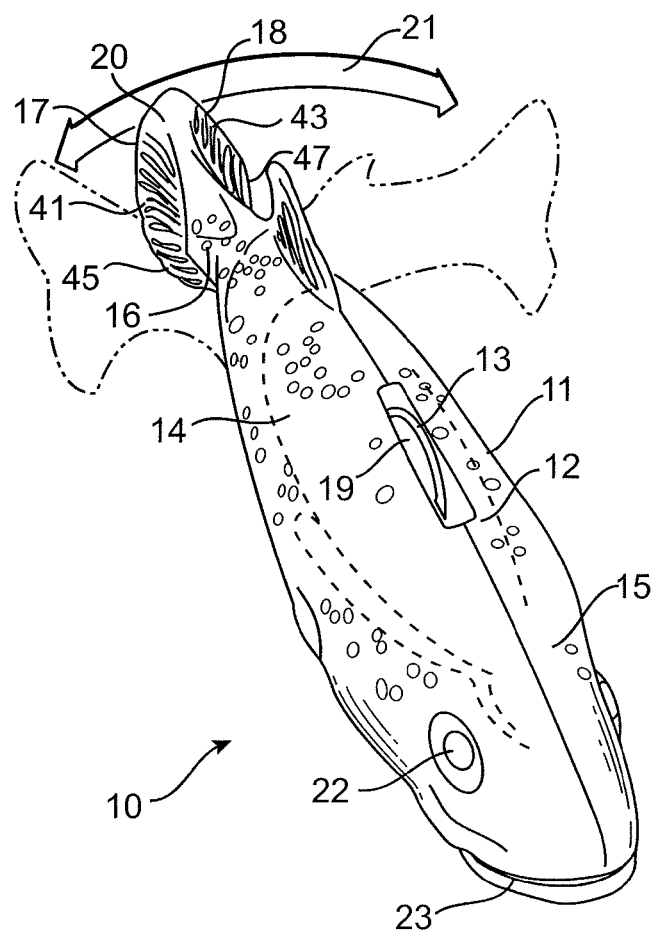
FIG. 1 is a simplified perspective diagram of a weedless lure device according to an embodiment of the present invention.
Figure 2:
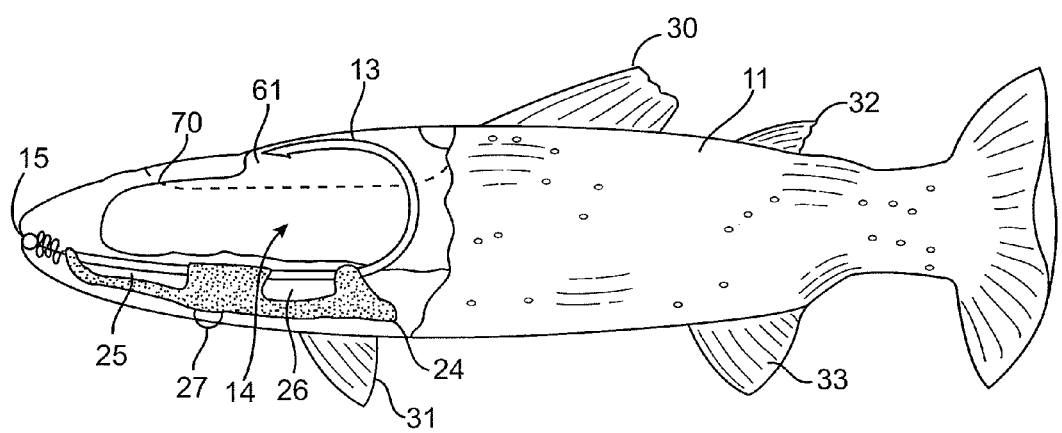
FIG. 2 is a simplified side-view diagram of a weedless lure device according to an embodiment of the present invention.

Referring generally to FIGS. 1 and 2, the specific embodiment illustrated reveals an elongated body 11 composed of a soft and flexible material designed to simulate the body of a fish in appearance and in motion. Optionally, the body 11 may be constructed in halves and joined together by a seam line 12. Alternately, the body 11 may be constructed of a single piece, which is molded with an integrated hook, weight, and an air cavity or ballast 14. Optionally, a hook 13 is embedded into the body 11 and anchored to a weighted attachment 24 as illustrated. In such an optional embodiment, a loop 15 may be provided for attachment to the end of a fishing line or lead. The loop 15 also includes a shank having a bend configured in an annular manner and a portion extending back toward the eyelet and terminating at a sharp point, which can be moved through opening, when the upper portion of the body collapses caused by a striking fish. The collapsed portion is illustrated by dotted line 70, which exposes the hook point and bend portion. In a specific embodiment, the hook bend and point are provided within a cavity region 14 according to a specific embodiment. In a preferred embodiment, the cavity region facilitates collapsing of the upper portion of the body to expose the hook point and shank to snag one or more portions of a fish. In a specific embodiment, the loop is a eyelet for the fishing line or other attachment member. Of course, there can be other variations, modifications, and alternatives.

In a specific embodiment, the body 11 of the lure or bait tapers laterally and rearwardly into a reduced tail portion 16 which then flares laterally into an enlarged tail 20 at a rear of the body. Optionally, the enlarged tail is constructed from symmetrical lobes 17 and 18. Thereby, the tail 20 is free to flex or swing to either side of the body 11 in a motion indicated by the double arrow 21. The position of the tail 20 during such motion is indicated in broken lines, and emulates a swimming motion designed to attract the target fish. In a specific embodiment, the head of the fish body 11 may include a molded replica of such anatomical details as a pair of eyes 22 and a mouth 23 so as to more convincingly simulate the appearance of a fish. In other embodiments, the head can be of another type of bait. Of course, there can be other variations, modifications, and alternatives.

In a specific embodiment, the body also includes an outer surface that can be configured via pattern and/or paint to resemble an actual fish in a lifelike manner. The outer surface is substantially continuous and is substantially free from any protruding hook members including hook points and/or shanks, although there can be some slight protrusions according to one or more embodiments. In a specific embodiment, the outer surface allows for a substantially weedless and/or snag proof fishing lure. In a specific embodiment, the loop and/or eye is also embedded within the outer surface, while an attached fishing lure can extend out of such surface. In other embodiments, the loop or eye can protrude slightly outside of the outer surface, although there can be other embodiments including fully exposed loop portions as well. Of course, there can be other variations, modifications, and alternatives.

In a preferred embodiment, the outer surface includes at least one opening 19 to expose a portion of the hook member. In a specific embodiment, the opening includes a border region 61, which allows the point of the hook and member to be exposed upon a striking fish. In a specific embodiment, the border is substantially smooth and allows the point to pierce into one or more portions of the strike fish, while a portion of the outer surface and body portion collapse to allow the hook point to protrude and snag onto one or more portions of the fish. In a specific embodiment, the bend of the hook, point, and barb are substantially free from contact with any of the plastic body region and allowed to move freely to be exposed. In a specific embodiment, the body portion includes one or more cavities 14 to facilitate a temporary bending and/or collapsing of the body. Of course, there can be other variations, modifications, and alternatives.

Referring specifically to FIG. 2, the float and swim characteristics can optionally be controlled using a weight 24 and cavity region, which acts as a ballast and/or air pocket. In a specific embodiment, the weight can be configured in shape and size. Additionally, the cavity region can be configured in shape and size according to a specific embodiment. In a preferred embodiment, the cavity region can be configured in reference to the body to achieve desirable swimming characteristics. In the optional embodiment illustrated, it can be seen that the weight is characterized by a body mass 24 depending downwardly therefrom. In this optional embodiment, the mass 24 is firmly secured to the hook shank and includes a pair of openings 25, 26 through which material of the body 11 passes to insure securement and immobility of the hook and weight. Also, the shape of the mass 24 is such that a portion resides in the head of the fish lure body 11 while another portion extends rearwardly, approaching the mid-section of the body 11. Optionally, a loop 27 downwardly depends from the mass and may be used for the fastening of a hook in combination of an integrated hook. As discussed in greater detail below, in an optional embodiment the portion proximate the head of the body may be less dense than the potion proximate the mid-section. For example, the weigh could include a portion proximate the head formed from a polymer foam, and a portion proximate the mid-section formed from a metal. Controlling the relative densities, as well as the shape and location of the weight and cavity aid in designing the buoyancy and motion characteristics of the lure or bait. Of course, there can be other variations, modifications, and alternatives.

Figure 2A:
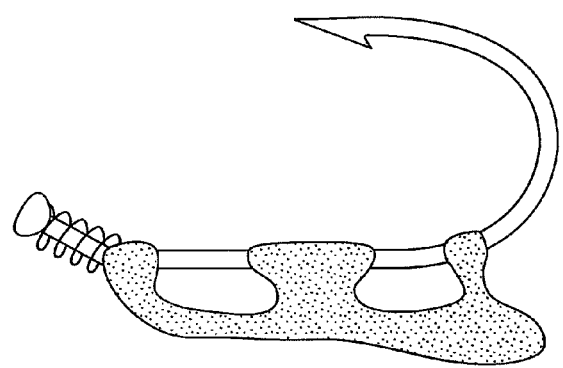
FIG. 2A is a simplified side view diagram of a weighted hook device according to an embodiment of the present invention.

As shown, FIG. 2 further illustrates that the body 11 may include a dorsal fin 30 and a belly fin 31, as well as stabilizing fins 32, 33. Such fins 30-33 may serve as fluid dynamic stabilizers as well as completing the image of a swimming fish. Of course, there can be other variations, modifications, and alternatives. Referring now to FIG. 2A, the hook member has an eyelet and a shank, as shown. In a specific embodiment, the shank extends from the eyelet to at least one bend section, which is configured in an annular manner and has at least one portion extending back toward a direction of the eyelet. Depending upon the embodiment, the hook can also include a pair or more of shanks and respective points. In a specific embodiment, the bend section terminates at a point. In a specific embodiment, the hook is integrated with a weight member or mass, as previously noted, which is coupled to one or more portions of the shank.

In a specific embodiment, the hook member comprises an anchoring device coupled to one or more portions of the shank. In a specific embodiment, the anchoring device is configured to be embedded within one or more portions of the head section or the soft bodied lure material. In a specific embodiment, the anchoring device comprises a plurality of wires configured in an annular manner. Alternatively, the anchoring device comprises one or more members configured in a spiral orientation such that the one or more members are firmly engaged and embedded within one or more portions of the head section or the soft bodied lure material. In a specific embodiment, the hook member, mass, and anchoring device are integrated with each other to form a single device, which is embedded within the body of the fishing lure. Of course, there can be other variations, modifications, and alternatives.

Figure 3:
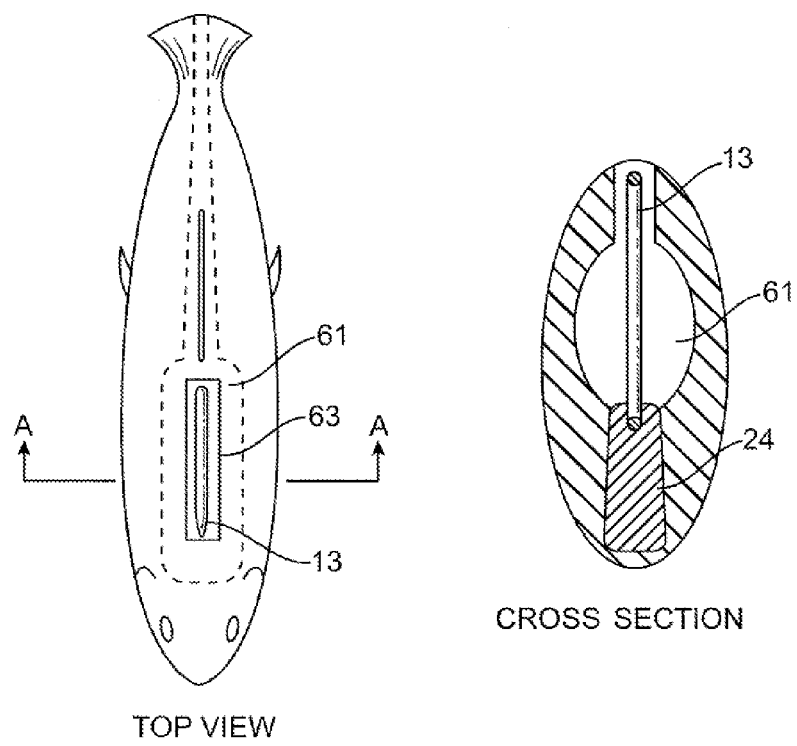
FIG. 3 are simplified cross-sectional and top-view diagrams of a weedless lure device according to an embodiment of the present invention.

In FIG. 3, it can be seen that the mass 24 is weighted and is completely surrounded by the soft material of the body 11. In a specific embodiment, cavity region 61 and opening 63 are also shown. The mass 24 optionally includes an anchor-portion that is completely embedded in the mass. The shank of the hook 13 may optionally be embedded into the mass of the weight 14 also. As discussed above, the relative densities of the weighted 14, the cavity 61, and the hook 13 may be designed such that the body 11 of the lure is maintained in a top-up orientation when pulled through the water. Likewise, the position of the weight 24, the cavity 61, and the hook 13, being in the forward part of the body 11 of the lure, maintains the lure 11 in a nose-down attitude or other configuration, further reinforcing the swimming imagery. Of course, there can be other variations, modifications, and alternatives.

FIGS. 3A and 3B are simplified top view and side view diagrams of a weedless lure device according to an alternative embodiment of the present invention. In a specific embodiment, the float and swim characteristics can optionally be controlled using a weight and a cavity region 100, which acts as a ballast and/or air pocket. In a specific embodiment, the weight can be configured in shape and size. Additionally, the cavity region can be configured in shape and size according to a specific embodiment. In a preferred embodiment, the cavity region can be configured in reference to the body to achieve desirable swimming characteristics. In a preferred embodiment, the cavity region extends from a region behind a head region and terminates before the hook bend. The cavity is also bounded by border region 105 and does not extend to the hook shank region according to a specific embodiment. In a specific embodiment, the body includes opening 101 or slot, which has border region to allow the hook to be exposed. Also shown is line 116, which represents the upper region of the body when a fish strikes and collapses the cavity region to cause exposure of the hook bend, tip, and barb according to a specific embodiment. In a specific embodiment, the cavity region is surrounded by a thickness of soft plastic material that has suitable strength to maintain its shape during use, but can easily collapse when a fish strikes to expose the point and hook bend. Of course, there can be other variations, modifications, and alternatives.

In the optional embodiment illustrated, it can be seen that the weight is characterized by a body mass depending downwardly therefrom. In this optional embodiment, the mass is firmly secured to the hook shank and includes a pair of openings through which material of the body passes to insure securement and immobility of the hook and weight. Also, the shape of the mass is such that a portion resides in the head of the fish lure body while another portion extends rearwardly, approaching the mid-section of the body. Optionally, a loop downwardly depends from the mass and may be used for the fastening of a hook in combination of an integrated hook. As discussed in greater detail below, in an optional embodiment the portion proximate the head of the body may be less dense than the portion proximate the mid-section. For example, the weigh could include a portion proximate the head formed from a polymer foam, and a portion proximate the mid-section formed from a metal. Controlling the relative densities, as well as the shape and location of the weight and cavity aid in designing the buoyancy and motion characteristics of the lure or bait. Of course, there can be other variations, modifications, and alternatives.

As shown, the body may include a dorsal fin and a belly fin, as well as stabilizing fins. Such fins may serve as fluid dynamic stabilizers as well as completing the image of a swimming fish. Of course, there can be other variations, modifications, and alternatives. In a specific embodiment, the hook member has an eyelet and a shank. In a specific embodiment, the shank extends from the eyelet to at least one bend section, which is configured in an annular manner and has at least one portion extending back toward a direction of the eyelet. Depending upon the embodiment, the hook can also include a pair or more of shanks and respective points. In a specific embodiment, the bend section terminates at a point. In a specific embodiment, the hook is integrated with a weight member or mass, as previously noted, which is coupled to one or more portions of the shank. Of course, there can be other variations, modifications, and alternatives.

In a specific embodiment, the hook member comprises an anchoring device coupled to one or more portions of the shank. In a specific embodiment, the anchoring device is configured to be embedded within one or more portions of the head section or the soft bodied lure material. In a specific embodiment, the anchoring device comprises a plurality of wires configured in an annular manner. Alternatively, the anchoring device comprises one or more members configured in a spiral orientation such that the one or more members are firmly engaged and embedded within one or more portions of the head section or the soft bodied lure material. In a specific embodiment, the hook member, mass, and anchoring device are integrated with each other to form a single device, which is embedded within the body of the fishing lure. Of course, there can be other variations, modifications, and alternatives.

In FIG. 3B, it can be seen that the mass is weighted and is completely surrounded by the soft material of the body. In a specific embodiment, cavity region 100 and opening are also shown. In a specific embodiment, the cavity 100 is substantially surrounded by plastic material 105 to form a sealed enclosure and has a vent 113, which can be configured in one of a plurality of spatial locations. In a specific embodiment, the body includes another cavity region 109, which extends from end region 111 toward the tail end or other region. In a specific embodiment, the other cavity includes a small vent 115, which may or may not be plugged. The mass optionally includes an anchor-portion that is completely embedded in the mass. The shank of the hook may optionally be embedded into the mass of the weight also. As discussed above, the relative densities of the weighted, the cavity, and the hook may be designed such that the body of the lure is maintained in a top-up orientation when pulled through the water. Likewise, the position of the weight, the cavity, and the hook, being in the forward part of the body of the lure, maintains the lure in a nose-down attitude or other configuration, further reinforcing the swimming imagery. Of course, there can be other variations, modifications, and alternatives.

Figure 3C:
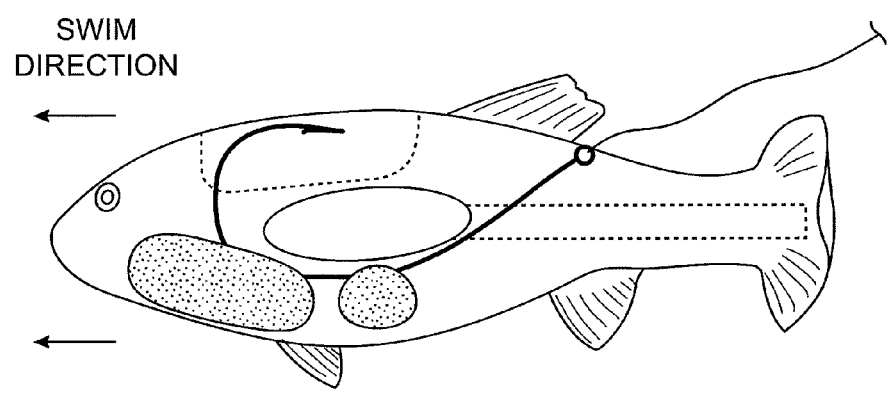
FIG. 3C is a simplified illustration of a swim bait configured to swim away from a direction of a rod and reel source according to an example of the present invention.
Figure 4:
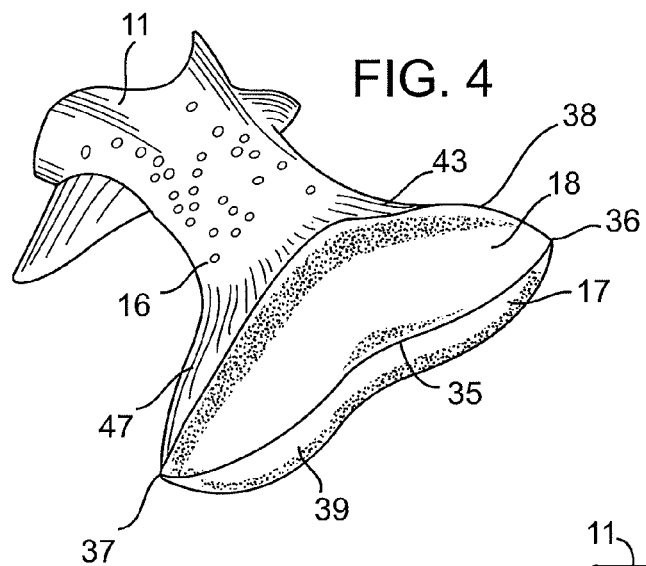
FIGS. 4 through 8 are simplified diagrams of a tail design according to an embodiment of the present invention.
Figure 5:
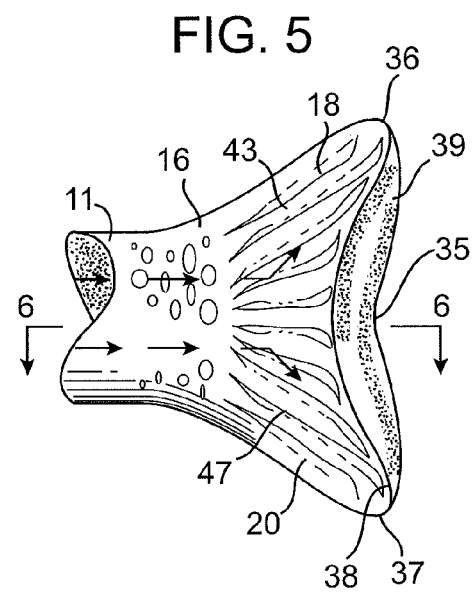
Figure 6:
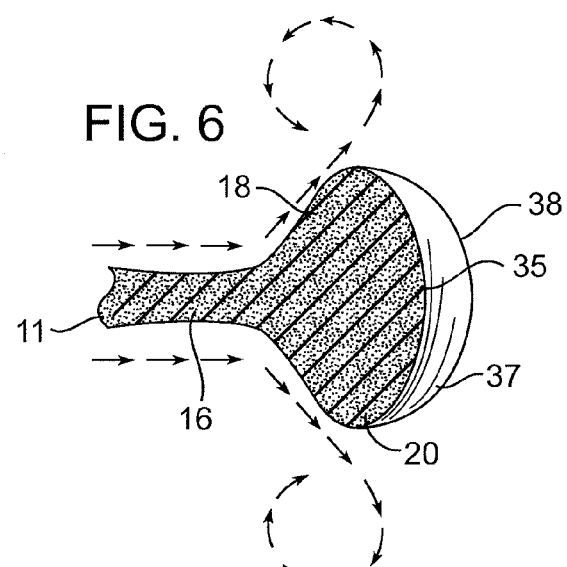
Figure 7:
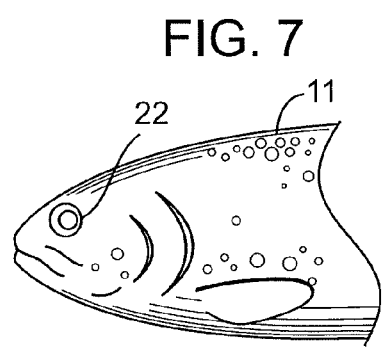

In yet an alternative embodiment, the present hook, cavity region, and weight can be configured differently. That is, the hook can be configured for fishing the lure in a "pitch" embodiment. In such embodiment, the hook eye protrudes out of a back region of the body and the hook point faces the tail region. In a specific embodiment, the weedless lure is allowed to be pitched into heavy cover and swims away from the angler in a manner where the angler maintains control of the lure from the eyelet protruding from the back region. An example of the pitch configuration is illustrated in a simplified diagram of FIG. 3C. In a specific embodiment, the hook point and bend are within the body region but are exposed by collapsing an internal cavity region, similar to the previous embodiments. Of course, there can be other variations, modifications, and alternatives.

Referring now in detail to FIGS. 1 and 4-6, the tail 16 of the fish lure is illustrated. As shown in FIG. 1, the tail 16 optionally includes a tapered top 36 formed from a pair of intersecting faces 41, 43 and a tapered bottom 37 formed from a pair of intersecting faces 45, 47. In the optional embodiment illustrated in FIGS. 4-6, the faces 41, 43, 45, 47 may be contoured to terminate in an edge 38 at the distal surface 39 of the tail 16. In the optional embodiment illustrated, the distal surface 39 of the tail may include a lateral indentation 35. Thus, in the optional embodiment of FIG. 4, the rear surface 36, 37 of the two lobes 17, 18, when taken together, provide a wavy, distal surface 39 that is diamond-shaped in cross-section. The bottom of the lateral indentation 35 may be defined as a middle side point between the tapering top 36 and tapering bottom 37 which extend toward the middle side point from the peripheral edge 38 of the tail portion 16.

When retrieved through the water, the tail 16 gently moves from side-to-side, making the lure appear to be swimming. This effect is at least in part achieved by a full profile scooped vortex tail construction. The expanded tail 16 creates left and right vortices in its wake. The vortices are more clearly shown in FIG. 6 by the clockwise and counter-clockwise arrangement of arrows. As the lure is drawn through the water, the water flowing over the tail 16 is diverted to either side. The movement of the tail 16 creates a "scooped" area on either side of the tail 16 and the water diverted is drawn into such "scooped" area at an oblique direction creating the vortex, indicated by the circle of arrows on either side of the tail portion 16. As noted above, any expanded tail 16 shape could function in this way, but in the optional embodiment shown, an expanded tail 16 with a substantially diamond-shaped cross-section with respect to the longitudinal axis is illustrated.

Figure 8:
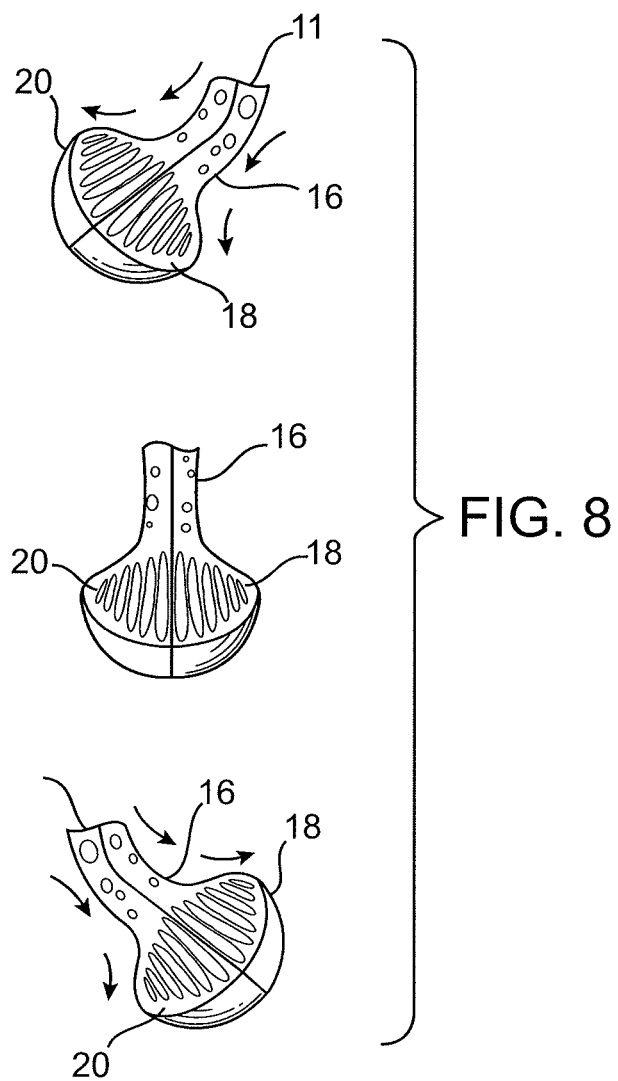

To further illustrate the side-to-side movement of the tail portion 16, reference is made to FIG. 8, wherein the top view illustrates the tail portion 16 swung in one direction, the left, while canting back towards the middle, the middle view illustrates the tail portion 16 at its neutral or central position, and the bottom view illustrates the tail portion 16 swung in the opposite, or right, direction and canting back towards the middle. The water flow as shown by the arrows strikes the laterally tapered tail portion 16, causing the tail to flex accordingly, giving the impression of swimming. At the same time, the diversion of the water flow by the tail portion 16 creates the vortices as described above. Of course, there can be other variations, modifications, and alternatives.

In a specific embodiment, the plastic body can be configured to provide a desired rate of fall or swim action. In a specific embodiment, the plastic body can be denser near a bottom region, which would allow the lower to fall and have a desired swimming action. In other embodiments, the plastic body can be substantially solid or the cavity region can be filled with one or more other materials, which are collapsible. In a specific embodiment, the plastic body can also be doped with salt or other minerals that lead to suitable swimming and falling actions. Alternatively, the plastic body can also be coated or painted according to a specific embodiment. In yet alternative embodiments, the plastic body can also include one or more metal or dielectric materials that assist in the rate of fall or swimming action. Of course, there can be other variations, modifications, and alternatives. Further details of the rate of fall and other details of other elements can be described in U.S. patent application Ser. No. 11/296,135 commonly assigned and hereby incorporated by reference in its entirety.

In a specific embodiment, the lure body includes a hollow rear region including tail for flexibility. In a specific embodiment, the rear region and tail are hollow to allow the tail to move in a flexible manner back and forth to simulate a realistic swimming action. In a specific embodiment, the rear of the tail can communicate to an opening in the hollow region. Alternatively, the rear of the tail is sealed and the hollow region is also sealed within the rear of the body region up to the tail end. Of course, there can be other variations, modifications, and alternatives.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A weedless fishing lure device comprising:
a soft bodied lure member having a first end and a second end;
at least one cavity region provided within one or more portions of the soft bodied lure member;
a lower portion of the soft bodied lure member;
an upper portion of the soft bodied lure member;
an opening within the upper portion of the soft bodied lure member, the opening having a border region, the border region being coupled to an outer region of the soft bodied lure member;
a hook member having a shank, a first hook end, a second hook end, and at least one bend section, the shank extending from the first hook end to the at least one bend section, the at least one bend section configured in an annular manner and having at least one portion extending back toward a direction of the first hook end and terminating at the second hook end, the second hook end being a point, the at least one bend section and second hook end of the hook member being substantially enclosed within an interior region of the soft bodied lure member defined by portions of the at least one cavity region and border region such that the shank is positioned within the lower portion of the soft bodied lure member, and the opening being configured to expose at least an upper portion of the second hook end, the point being substantially within a vicinity of the border region for snag proof or weedless operation;
a free from contact region defined by portions of the interior region of the soft bodied lure member, the free from contact region configuring the at least one bend section and the second hook end comprising the point to be substantially free from contact with any of the free from contact region of the soft bodied lure member and allowing the at least one bend section and the second hook end to move freely to be exposed;
a weight member coupled to one or more portions of the shank and embedded within the lower portion of the soft bodied lure member; and
an anchoring device coupled to one or more portions of the shank so as to be positioned between the first hook end of the hook member and the at least one bend section, the weight member being positioned between the anchoring device and the at least one bend, the anchoring device being configured to be embedded within one or more portions of the soft bodied lure member,
whereupon the at least one cavity region provided within the one or more portions of the soft bodied lure member is configured to fully or partially collapse to expose at least the point to hook a striking fish upon impact from the striking fish; and
whereupon the hook member, weight member, and anchoring device are integrated with each other to form a single device and provided within the soft bodied lure member.

2. The weedless fishing lure device of claim 1 wherein the shank includes one or more portions embedded and fixed within the lower portion of the soft bodied lure member and the at least one portion extending back toward the first hook end and the point are spatially disposed within the at least one cavity region.

3. The device of claim 1 wherein the anchoring device comprises a plurality of wires configured in an annular manner.

4. The device of claim 1 wherein the anchoring device comprises one or more members configured in a spatial orientation, the one or more members being firmly engaged and embedded within one or more portions of a head section of the soft bodied lure member.

5. The device of claim 1 wherein the at least one cavity region extends from the first end to the second end of the soft bodied lure member, the second end being sealed; and further comprising an air vent in communication with the at least one cavity region.

6. The device of claim 1 further comprising an air vent in communication with the at least one cavity region and provided within one or more portions of the lower portion of the soft bodied lure member.

7. The device of claim 1 wherein the weight member is configured to extend from the shank to form a keel like member.

8. The device of claim 1 wherein the soft bodied lure member is configured to partially collapse when struck by a fish.

9. The device of claim 1 wherein the point of the hook member is substantially weed-less and free from snags upon movement of the soft bodied lure member through one or more weeds or other structures.

10. The device of claim 1 wherein the soft bodied lure member is configured for one of: an imitation trout, an imitation bass, an imitation pan fish, an imitation mackerel, an imitation sardine, and an imitation shad.

11. The device of claim 1 further comprising the upper portion of the soft bodied lure member bordering an upper portion of the at least one cavity region.

12. The device of claim 1 wherein the border region of the opening further comprises an inner border region, the inner border region being within and coupled to the outer region of the soft bodied lure member.

13. The device of claim 12 wherein the inner border region visually exposes the at least one portion of the at least one bend section extending back toward the direction of the first hook end and the point.

14. The device of claim 12 wherein the inner border region is substantially smooth to allow the point to be exposed while collapsing a portion of the outer region and the at least one cavity region.

15. The device of claim 1 wherein the weight member includes a pair of openings through which material of the soft bodied lure member passes.

16. The device of claim 1 further comprising a tail having a tapered top and a tapered bottom, the tail having a wavy, distal surface with a diamond cross-section.

17. The device of claim 1 further comprising a reduced tail portion and an enlarged tail, the reduced tail portion flaring laterally into the enlarged tail, the enlarged tail having symmetrical lobes.

18. A weedless fishing lure device comprising:
   a single piece soft bodied lure material having a first end and a second end;
   an air ballast having at least one cavity region provided within one or more portions of the single piece soft bodied lure material and extending from a vicinity of the first end of the single piece soft bodied lure material toward the second end of the single piece soft bodied lure material;
   a lower portion of the soft bodied lure material bordering a lower portion of the at least one cavity region and an upper portion of the single piece soft bodied lure material bordering an upper portion of the at least one cavity region;
   an outer region formed from the single piece soft bodied lure material;
   an opening within the upper portion of the single piece soft bodied lure material, the opening having an inner border region, the inner border region being within the outer region of the single piece soft bodied material;
   a hook member having an eyelet, at least one bend section, and a shank, the shank extending from the eyelet to the bend section, the at least one bend section configured in an annular manner and having at least one portion extending back toward a direction of the eyelet and terminating at a point, the hook member being substantially enclosed within the lower portion of the single piece soft bodied lure material, and the opening exposes at least the at least one portion extending back toward the direction of the eyelet and the point, the point being substantially within a vicinity of the inner border region for snag proof or weedless operation;
   a free from contact region defined by portions of the at least one cavity region and the inner border region, the free from contact region configuring the at least one bend section and the point to be substantially free from contact with any of the single piece soft bodied lure material and allowing the at least one bend section and the point to move freely to be exposed;
   a weight member coupled to and integrated with one or more portions of the shank and embedded within the lower portion of the single piece soft bodied lure material such that the weight member is completely surrounded by the single piece soft bodied lure material; and
   an anchoring device coupled to one or more portions of the shank so as to be positioned between the eyelet of the hook member and the at least one bend section, the weight member being positioned between the anchoring device and the at least one bend, the anchoring device being configured to be embedded within one or more portions of the single piece soft bodied lure material; and
   whereupon the hook member, weight member, and anchoring device are integrated with each other to form a single device and are provided within the single piece of soft bodied lure material.

\* \* \* \* \*